United States Patent [19]

Osawa

[11] Patent Number: 4,929,096
[45] Date of Patent: May 29, 1990

[54] LINEAR GUIDE APPARATUS

[75] Inventor: Nobuyuki Osawa, Takasaki, Japan

[73] Assignee: Nippon Seiko Kabushiki Kaisha, Tokyo, Japan

[21] Appl. No.: 358,543

[22] Filed: May 26, 1989

[30] Foreign Application Priority Data

May 31, 1988 [JP] Japan .............................. 63-72337[U]

[51] Int. Cl.⁵ .............................................. F16C 29/06
[52] U.S. Cl. ..................................................... 384/45
[58] Field of Search ............................ 384/45, 43, 44; 464/168

[56] References Cited

U.S. PATENT DOCUMENTS

| 4,253,709 | 3/1981 | Teramachi . | |
| 4,647,226 | 3/1987 | Mottate | 384/45 |
| 4,778,284 | 10/1988 | Teremachi | 384/45 |
| 4,795,272 | 1/1989 | Mottate | 384/45 |
| 4,806,022 | 2/1989 | Takahiro | 384/45 |

Primary Examiner—Lenard A. Footland
Attorney, Agent, or Firm—Basile and Hanlon

[57] ABSTRACT

An upper ball-retainer for holding the balls in a pair of upper ball rolling grooves formed in the inner surface of the slider main body is made of a synthetic resin and has a rectangular dish shape. Supporting portions protrude axially from axial opposite ends of the ball-retainer, and the supporting portions are respectively inserted into supporting holes formed in the end caps attached to opposite ends of the slider main body so that the upper ball-retainer is accommodated in a space between the upper surface of the guide rail and the inner surface of the slider main body. A ball holding groove having a circular arc cross section is formed in each of the lateral sides of the upper ball-retainer and extends over the whole axial length thereof to hold the balls against the corresponding ball rolling groove of the slider main body. A lip portion of a thin wall is formed at lower end of the ball holding groove and protruding downwardly therefrom. The lip portion is deformable elastically in a direction to expand the ball holding groove and, normally, the lip portion together with the ball rolling groove of the slider main body has a width narrower than the diameter of the ball.

3 Claims, 4 Drawing Sheets

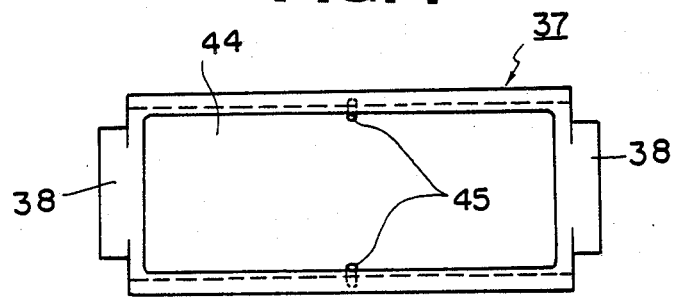
FIG. 4
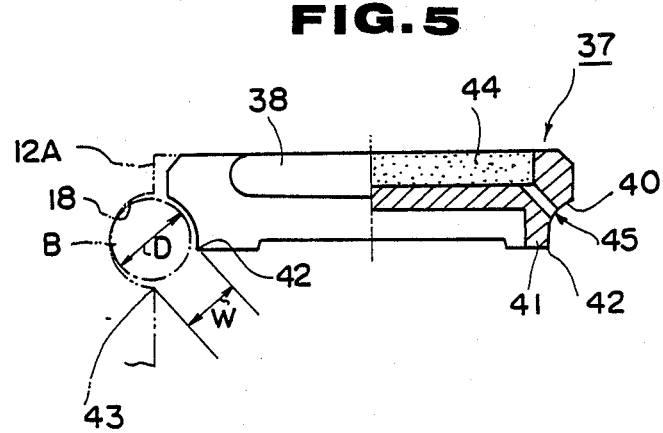
FIG. 5
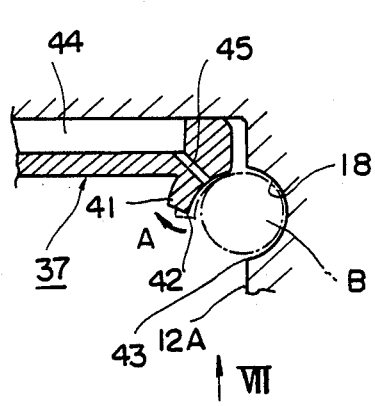
FIG. 6
FIG. 7

LINEAR GUIDE APPARATUS

BACKGROUND OF THE INVENTION

1. Field of the Invention

The present invention relates to a linear guide apparatus including a guide rail and a slider movable on the guide rail through rolling of balls interposed therebetween, and in particular, to a linear guide apparatus having an improved ball retainer.

2. Description of the Prior Art

A prior art ball retainer of a linear guide apparatus of this type is disclosed, for example, in U.S. Pat. No. 4,253,709 (Japanese Patent Laid-Open Publication No. 55-72912).

As shown in FIGS. 10 and 11, the ball retainer 3 of a linear guide apparatus including a guide rail 1 and a slider 2 movably mounted on the guide rail 1 through rolling balls B is made of a thin steel plate. The ball retainer 3 is formed by stamping so that both sides have a wave form along the inner surface of the slider 2. In each of the sides of the wave form, a window 5 is formed having a width somewhat smaller than a diameter of the ball B and extending axially along the length of the ball retainer 3.

The retainer 3 is secured to the inner surface of the slider 2 by fixing screws 4, and the balls B mounted in the window 5 are held in ball rolling grooves 6 and 7 of the inner surface of the slider 2.

When the slider 2 is linearly moved on the guide rail 1, many balls B roll in the ball rolling grooves 6 and 7 and in the ball rolling grooves 8 and 9 of both side surfaces of the guide rail 1.

However, in such a prior art linear guide apparatus, the ball retainer 3 is made of a thin steel plate, and the balls B are held in the ball rolling grooves 6 and 7 by ball holding stocks of the windows 5 formed in the sides of the ball retainer 3. As a result, the following problems are encountered.

In the prior art apparatus, since a lubricant is not supplied through the ball retainer portion, lubrication is apt to be interrupted.

It is necessary to remove the ball retainer 3 at the time of mounting the balls B in the ball rolling grooves 6 and 7 of the slider and at the time of replacing the balls B. Thus, the work is troublesome. Furthermore, since the ball retainer is tightened by screws to the slider, the assembling is also troublesome.

SUMMARY OF THE INVENTION

It is an object of the present invention to provide a linear guide apparatus including a ball retainer which is elastic and enables easy mounting of the balls and the assembling and disassembling of the ball retainer itself. It is another object to provide a ball retainer which has a self-lubricating property, and which is made of plastic to permit easy molding.

In accordance with the present invention, in a linear guide apparatus comprising a guide rail having axially extending upper ball rolling grooves in both ridge portions between an upper surface and both side surfaces, and lower ball rolling grooves formed in both side surfaces, a slider main body mounted on the guide rail and movable in the axial direction and having upper and lower ball rolling grooves formed in an inner surface at positions respectively corresponding to the upper and lower ball rolling grooves of the guide rail. A pair of end caps are respectively attached to opposite ends of the slider main body. Many balls are inserted in the corresponding ball rolling grooves of the guide rail and the slider main body, and ball retainer means for holding the balls in the upper and lower ball rolling grooves of the slider main body. The invention comprises the improvement in which the ball retainer means comprises an upper ball retainer for holding the balls of the upper ball rolling grooves, and lower ball retainers. The upper ball retainer is made of a synthetic resin and has a substantially rectangular shape. The upper ball retainer includes axially protruding supporting portions provided at axial opposite ends of the ball retainer and inserted into supporting holes of the end caps to support the upper ball retainer in a space between the upper surface of the guide rail and the inner surface of the slider main body facing the upper surface. A ball holding groove having an arcuate cross section is formed in each of the lateral side surfaces of the upper ball retainer extending over a whole length thereof. A lip portion is formed at a lower end portion of each of the ball holding groove of the upper ball retainer. The lip portion is elastically deformable in a direction to expand the ball holding groove and forming together with corresponding upper ball rolling groove of the slider main body an opening having a width substantially narrower than the diameter of the balls.

In another aspect of the invention, the lower ball retainers are respectively disposed in axial recesses of the guide rail formed in both the side surfaces of the guide rail. Each of the lower ball retainers has an elongate shape and is made of a synthetic resin material. Supporting portions are provided at axial opposite ends of each of the lower ball retainers to be supported by the end caps respectively. A ball holding groove having an arcuate cross section is formed in each of the lower ball supporting retainers extending over a whole length thereof. A lip portion is formed at an upper end portion of the ball holding groove, the lip portion being elastically deformable in a direction to expand the ball holding groove and normally forming together with the corresponding lower ball rolling groove of the slider main body an opening having a width substantially narrower than the diameter of the balls.

Furthermore, the upper ball retainer may be formed with a lubricant reserving recess in the upper surface thereof and with oil feed holes connecting the lubricant reserving recess to the ball holding grooves corresponding thereto.

At the time of mounting or replacing of the balls, the lip portion of the ball holding groove can be expanded forcibly by utilizing the elasticity of the retainer, and thus there is no need to remove the ball retainer.

Moreover, when the lubricant reserving recess is formed in the upper surface of the ball retainer of the slider main body, a great amount of lubricant can be reserved therein to facilitate maintenance.

BRIEF DESCRIPTION OF THE DRAWINGS

The drawings show embodiments of the present invention, in which:

FIG. 4 is a plan view of the ball retainer in FIG. 1;

FIG. 5 is a front view of the ball retainer with a right half part in cross section;

FIG. 6 is an enlarged sectional view of a main part to explain the function of the ball retainer;

FIG. 7 is a diagram as viewed in the direction of arrow VII in FIG. 6;

DESCRIPTION OF THE PREFERRED EMBODIMENTS

A first embodiment of the present invention will be described with reference to FIGS. 1 to 7.

Figure 1:
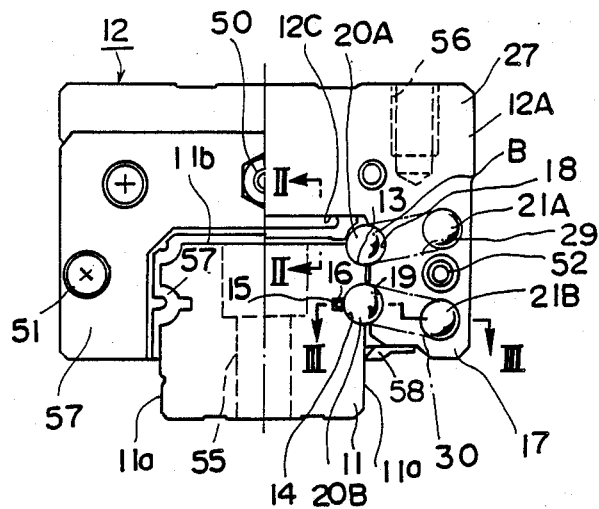
FIG. 1 is a front view of a first embodiment of a linear guide apparatus with a right half part of an end cap cut away.
Figure 2:
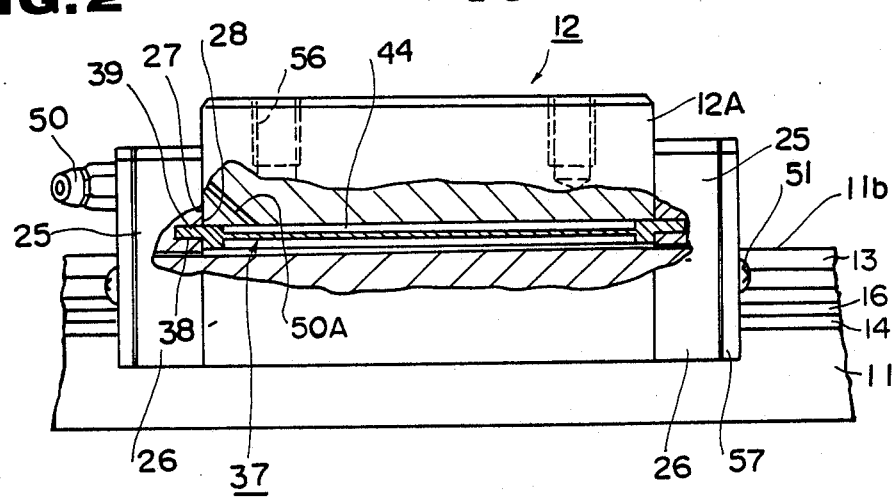
FIG. 2 is a side view of the linear guide apparatus with a part in cross section taken along the line II—II in FIG. 1.

Referring to FIGS. 1 and 2, a slider 12 having an inverted U-shaped cross section is mounted on a guide rail 11 movable relative to the guide rail 11 in an axial direction. An upper ball rolling groove 13 having a cross section of a quarter circular shape is formed in each of the edges between an upper surface 11b and side surfaces 11a and 11a of the guide rail 11. Furthermore, an under all rolling groove 14 is formed at an intermediate portion in each of the side surfaces 11a and 11a of the guide rail 11. An escape channel 16 of a ball retainer 15 of a wire shape is formed along the axial direction in a bottom of the under ball rolling groove 14 to prevent the balls B from falling out of the rolling groove 14.

On the other hand, each of both side walls 17 and 17 of a slider main body 12A of the slider 12 has an upper ball rolling groove 18 corresponding to the upper ball rolling groove 13 of the guide rail 11, and a lower ball rolling grooves 19 corresponding to the lower ball rolling groove 14 of the guide rail 11 such that the upper and lower ball rolling grooves 18 and 19 have a cross section of a half circular shape.

The upper ball rolling groove 13 of the guide rail 11 and the upper ball rolling groove 18 of the slider main body 12A constitute an upper ball rolling path 20A. The lower ball rolling groove 14 of the guide rail 11 and the lower ball rolling groove 19 of the slider main body 12A constitute a lower ball rolling path 20B.

Each side wall 17 of the slider main body 12A has an upper ball return path 21A of a circular cross section formed penetrating axially in parallel with the ball rolling path 20A, and has a lower ball return path 21B formed similarly penetrating axially in parallel with the lower ball rolling path 20B.

End caps 25 and 25 are respectively joined to opposite ends of the slider main body 12Aa, and each end cap 25 is an injection mold product of a synthetic resin material and has an inverted U-shaped cross section similar to the slider main body 12A. Each side wall 26 of the end cap 25 has upper and lower curved paths 29 and 30 of a half doughnut shape formed in an end surface 28 which is joined to an end surface 27 of the slider main body 12A. The upper curved path 29 brings the upper ball rolling path 20A into communication with the upper ball return path 21A, and the lower curved path 30 brings the lower ball rolling path 20B into communication with the lower ball return path 21B.

Figure 3:
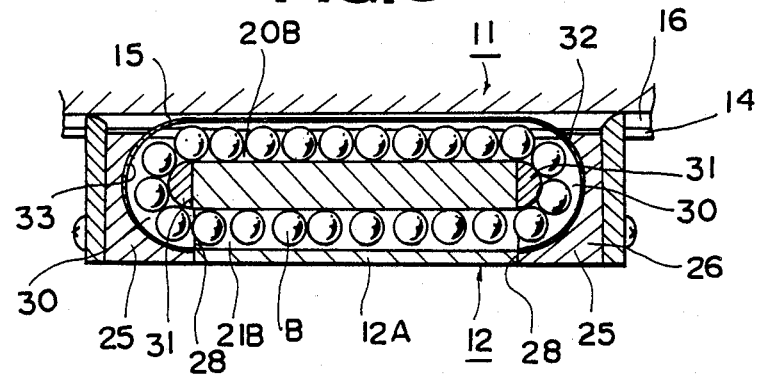
FIG. 3 is a sectional view taken along the line III—III in FIG. 1.

The upper curved path 29 and the lower curved path 30 are formed by forming upper and lower recesses of a half circular cross section in the end surface 28 of each wall 26 of the end cap 25, and by forming a recess of a half circular cross section extending vertically crossing the upper and lower curved paths 29 and 30, and then a return guide 31 of a half column shape is fitted into the vertically extending recess as shown in FIG. 3.

Accordingly, an upper ball infinitely circulating route constituted by the ball rolling path 20A, the upper ball return path 21A, and two upper curved paths 29, and a lower ball infinitely circulating route constituted by the lower ball rolling path 20B, the lower ball return path 21B, and two curved paths 30 are formed in each side of the guide rail 1 symmetrically with respect to the longitudinal axis of the guide rail 1. Many balls B are rollably inserted in each of the ball infinitely circulating route.

Furthermore, in each of the curved paths 29 and 30 of the end cap 25, a ball scooping portion 32 is formed at an inner end of the ball guide surface which protrudes in a half circular shape. A tip end having an acute angle is positioned to approach the ball rolling groove 13 or 14 of the guide rail 1.

In order to hold the balls B without falling out of the slider 12 even when the slider 12 is not assembled to the guide rail 11, a ball retainer is attached in close proximity to each of the ball rolling grooves 18 and 19 of the slider 12.

In this embodiment, the ball retainer 15 of a wire shape is used to hold the balls B within the lower ball rolling groove 19. The wire retainer 15 is mounted in a wire retainer channel 33 formed in a bottom of the guide surface of the lower curved path 30 of the end cap 25 and, when the slider 12 is assembled to the guide rail 11, the wire retainer 15 is accommodated in the escape channel 16 of the guide rail 11. As a result, interference with the guide rail 11 is prevented.

In contrast, the balls B within the upper ball rolling grooves 18 of the slider 12 are held by a ball retainer 37 shown in FIGS. 4 and 5 which is made of a synthetic resin and injection molded in a dish shape.

The ball retainer 37 is fixed to an inner surface side of the slider main body 12A. For this purpose, supporting portions 38 and 38 are formed which protrude axially from axial opposite ends of the ball retainer 37. On the other hand, a supporting hole 39 is formed in the end surface 28 of the end cap 25, which end surface 28 is joined to the end surface 27 of the slider main body 12A. When each end cap 25 is assembled to the slider main body 12A, the supporting portion 38 is fitted into the supporting hole 39 and the retainer 37 is supported by the end caps 25 such that the reatiner 37 is accommodated in a space between the upper surface 11b of the guide rail 11 and an inner surface 12c of the slider main body 12A. In both lateral sides of the ball retainer 37 which has a rectangular dish shape, there are formed with ball holding grooves 40 having a quarter circular cross section and extending over the whole length so as to hold the balls B in the pair of upper ball rolling grooves 18 and 18 of the slider main body 12A at the same time.

As shown in the cross section in FIG. 5, a thin walled lip portion 41 is formed at a lower end of the ball holding groove 40 of the ball retainer 37 and protrudes downwardly therefrom. The lip portion 41 can be forcibly deformed elastically in a direction to expand the circular arc of the ball holding groove 40. An opening W having a width substantially narrower than the diameter D of the ball B is normally formed between an outer edge 42 of the lip portion 41 and a lower edge 43 of the upper ball rolling groove 18.

Furthermore, a recess formed in the upper surface of the ball retainer 37 acts as a lubricant reserving recess 44, and oil feed holes 45 are formed to connect the lubricant reserving recess 44 and the ball holding grooves 40 respectively.

Again in FIGS. 1 and 2, reference numeral 50 designates an oil feed nipple and lubricant injected from the oil nipple 50 is fed into the curved paths 29 and 30, and the lubricant reserving recess 44 through an oil feed groove 50A formed in the joining end surface 28. Reference numeral 51 designates a fixing screw for fixing the end cap 25 to the slider main body 12A.

Furthermore, reference numeral 55 designates an inserting hole for a bolt for securing the guide rail 11 to a base (not shown) etc., when the linear guide apparatus is to be used, and reference numeral 56 designates a screw hole for a bolt for fixing a driven member, such as a table or the like, to the slider 12. Moreover, reference numeral 57 designates a wiper seal made of a synthetic rubber and attached to the end cap 25 in order to wipe the ball rolling grooves 13 and 14 to prevent foreign particles from entering the inside. Reference numeral 58 designates an under seal attached to the bottom of the slider.

Next, the operation of this embodiment will be described.

In assembling the end caps 25 to the slider main body 12A, the supporting portions 38 of the ball retainer 37 are inserted into the supporting holes 39 respectively. Then, the joining end surfaces 28 are joined to the joining end surfaces of the slider main body 12A respectively, and the fixing screws 51 are screwed into the screw holes 52.

Each lip portion 41 of the ball retainer 37 assembled to the slider main body 12A in this manner is pushed to expand in the direction of the arrow in FIGS. 6 and 7 by using a screw driver or the like. In this case, it is preferable to expand the lip portion 41 at an intermediate position of the whole length of the lip portion 41. The balls B are mounted by expanding the opening W between the edge 43 of the upper ball rolling groove 18 of the slider main body 12A and the edge 42 of the lip portion 41 as large as possible in an arch shape.

When replacing the balls B damaged by the intrusion of foreign particles or the like during use, or when replacing the balls B in order to change a preload, it is only necessary to do such work by expanding or opening the lip portion 41. There is no need to remove the ball retainer. Accordingly, such work is facilitated and easy.

After mounting the balls B, when the slider 12 assembled to the guide rail 11 is moved in the axial direction, the balls B inserted in the upper (lower) ball rolling path 20A (20B) roll with the movement of the slider 12, and move in a direction opposite to the movement direction. At the end of the slider 12, the balls B are made to change direction by being introduced by the ball scooping protrusion 32 and make a U-turn along the upper (lower) curved path 29 (30).

Then, the balls B reach the end cap 25 of the opposite end through the upper (lower) ball return path 21A (21B). Here, the balls B make again a U-turn along the upper (lower) curved path 29 (30), and return to the upper (lower) ball rolling path 20A (20B) to repeat circulation while being rolled continuously.

The lubricant which is injected from the oil feed nipple 50 and stored in the lubricant reserving recess 44 of the ball retainer 37 can be fed to necessary portions for a long term through the oil feed holes 45 so that smooth rolling of the balls and smooth travelling of the slider 12 is ensured.

Figure 8:
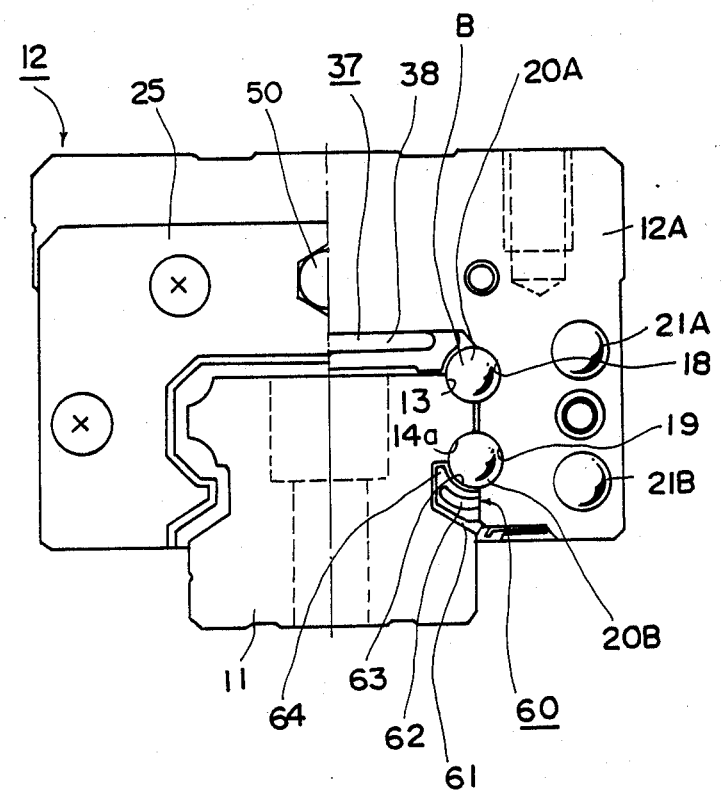
FIG. 8 is a front view of a second embodiment of the linear guide apparatus with a right half part cut away.
Figure 9:
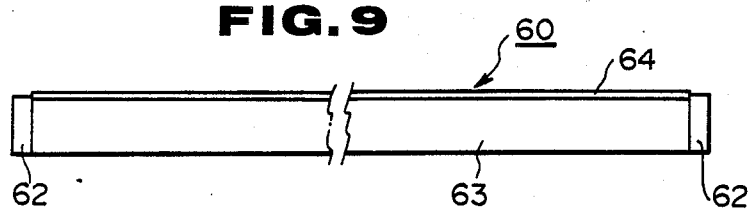
FIG. 9 is a plan view of the ball retainer shown in FIG. 8.
Figure 10:
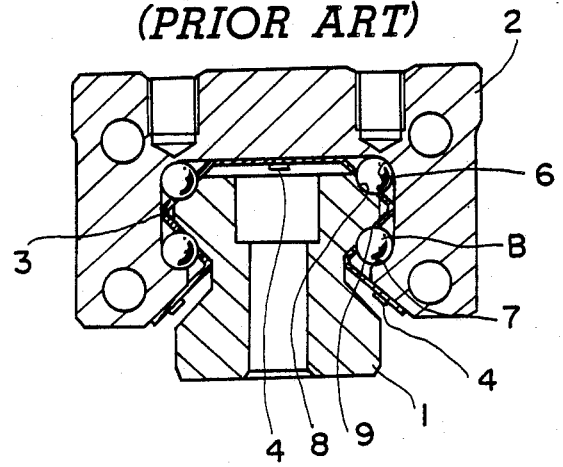
FIG. 10 is a cross sectional view of a prior art linear guide apparatus.
Figure 11:
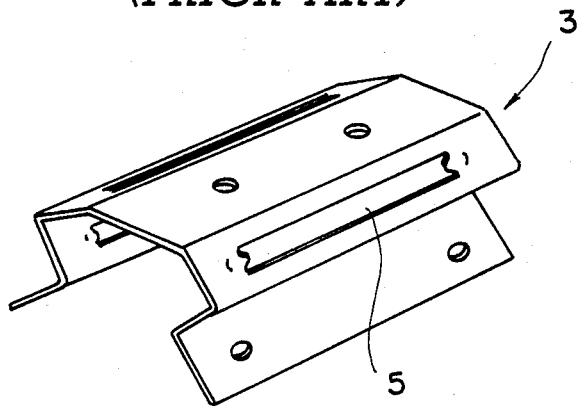
FIG. 11 is a perspective view of the ball retainer shown in FIG. 10.

FIGS. 8 and 9 illustrate a second embodiment of this invention.

In this embodiment, a ball retainer 60 for the lower ball rolling path 20B is made of a synthetic resin.

In this case, a lower ball rolling groove 14a has a cross section of a quarter circular shape. A recessed groove 61 of a substantially trapezoidal shape is formed just below the lower ball rolling groove 14a.

The ball retainer 60 is supported by the end caps 25 through supporting portions 62 protruding axially from axial opposite ends of the ball retainer 60 and is accommodated in the recessed groove 61.

When the slider 12 is removed from the guide rail 11, the balls B in the lower ball rolling groove 19 are held by a ball holding groove 63 formed in the ball retainer 60 which has a quarter circle cross section so that falling off of the balls is prevented.

A lip portion 64 having a thin wall is formed at an upper end portion of the ball holding groove 63 of the ball retainer 60. The lip portion 64 can be forcibly deformed elastically in a direction to expand the circular arc of the ball holding groove 63. As a result, the mounting and demounting of the balls B can be made easily by expanding and deforming the lip portion 64.

In this embodiment the ball retainer 60 for the lower ball rolling path 20B is also made of a synthetic resin and deformable elastically.

Moreover, since the ball retainers 37 and 60 in each embodiment can be mass produced by injection molding of a synthetic resin material, inexpensive ball retainers can be provided.

In the present invention, due to the arrangement as described above, the following advantages are provided.

The mounting and demounting of the balls in and out of the ball rolling grooves can be performed easily by elastically deforming the ball retainer and expanding the space between the grooves and the ball retainer. As a result, there is no need to remove the ball retainer from the slider and such work is convenient and easy.

In addition, by forming the lubricant reserving recess in the ball retainer, the feeding of oil becomes smooth and this, in turn, improves the operation and positioning accuracy of the slider.

What is claimed is:

1. In a linear guide apparatus including a guide rail having axially extending upper ball rolling grooves formed in both edge portions between an upper surface and both side surfaces, and lower ball rolling grooves formed in both side surfaces, a slider main body mounted on said guide rail and movable in the axial direction and having upper and lower ball rolling grooves formed in an inner surface at positions respectively corresponding to the upper and lower ball rolling grooves of said guide rail, a pair of end caps respectively attached to opposite ends of said slider main body and having supporting holes formed therein, a plurality of balls inserted in the corresponding ball rolling grooves of said guide rail and said slider main body, and ball retainer means for holding the balls in the upper and lower ball rolling grooves of said slider main body, the improvement comprising:

said ball retainer means comprises an upper ball retainer for holding the balls of the upper ball rolling grooves, and a pair of lower ball retainers, said upper ball retainer is made of a synthetic resin material and has a substantially rectangular shape, said upper ball retainer supporting portions provided at axial opposite ends of said ball retainer and protruding axially therefrom and inserted into supporting holes of said end caps to support said upper ball retainer in a space between the upper surface of said guide rail and the inner surface of said slider main body facing the upper surface, a ball holding groove having an arcuate cross section formed in each of lateral side surfaces of said upper ball retainer extending over a whole length thereof, and a lip portion formed at an lower end portion of each the ball holding groove of said upper ball retainer, said lip portion being elastically deformable in a direction to expand the ball holding groove and forming together with a corresponding upper ball rolling groove of said slider main body an opening having a width substantially narrower than the diameter of the balls.

2. A linear guide apparatus according to claim 1, wherein said pair of lower ball retainers are respectively disposed in axial recesses formed in both side surfaces of said guide rail, and each of said lower ball retainers has an elongate shape and is made of a synthetic resin material, supporting portions are provided at axial opposite ends of each of said lower ball retainers and are supported by said end caps, a ball holding groove having an arcuate cross section is formed in each of said lower ball supporting retainers extending over a whole length thereof, and a lip portion is formed at an upper end portion of the ball holding groove, said lip portion being elastically deformable in a direction to expand the ball holding groove and normally forming together with corresponding lower ball rolling groove of said slider main body an opening having a width substantially narrower than the diameter of the balls.

3. A linear guide apparatus according to claim 1, wherein said upper ball retainer has a lubricant reserving recess formed in an upper surface, and has an oil feed hole connecting said lubricant reserving recess to the ball holding groove.

* * * * *